(12) United States Patent
Vijh et al.

(10) Patent No.: US 8,187,016 B2
(45) Date of Patent: May 29, 2012

(54) TERMINAL ASSEMBLY INCLUDING A JUNCTION BOX FOR A PHOTOVOLTAIC MODULE AND METHOD OF FORMING

(75) Inventors: Aarohi S. Vijh, Sylvania, OH (US);
Barry K. Groves, Northwood, OH (US);
Kenneth C. Draeger, Toledo, OH (US)

(73) Assignee: Xunlight Corporation, Toledo, OH (US)

( * ) Notice: Subject to any disclaimer, the term of this patent is extended or adjusted under 35 U.S.C. 154(b) by 0 days.

(21) Appl. No.: 13/040,412

(22) Filed: Mar. 4, 2011

(65) Prior Publication Data

US 2011/0217856 A1  Sep. 8, 2011

Related U.S. Application Data

(60) Provisional application No. 61/311,097, filed on Mar. 5, 2010.

(51) Int. Cl.
*H01R 13/52* (2006.01)

(52) U.S. Cl. .................. 439/276; 499/271; 499/589

(58) Field of Classification Search .................. 439/276, 439/271, 587–589, 917, 936, 76.2; 136/243, 136/521
See application file for complete search history.

(56) References Cited

U.S. PATENT DOCUMENTS

| | | | |
|---|---|---|---|
| 3,691,505 A | 9/1972 | Graves | |
| 3,829,546 A | 8/1974 | Hunter et al. | |
| 4,310,211 A * | 1/1982 | Bunnell et al. | 439/358 |
| 4,460,232 A | 7/1984 | Sotolongo | |
| 4,654,470 A | 3/1987 | Feldman et al. | |
| 5,513,075 A | 4/1996 | Capper et al. | |
| 7,938,661 B2 * | 5/2011 | Good et al. | 439/271 |
| 8,083,540 B1 * | 12/2011 | Spicer et al. | 439/460 |
| 2005/0284515 A1 | 12/2005 | Stevens | |
| 2006/0180196 A1 | 8/2006 | Lares et al. | |
| 2007/0002561 A1 | 1/2007 | Tesmer et al. | |
| 2010/0068921 A1 | 3/2010 | Richter | |
| 2010/0112851 A1 | 5/2010 | Giefers | |
| 2010/0139760 A1 | 6/2010 | Giefers | |
| 2010/0173511 A1 | 7/2010 | Giefers | |
| 2010/0175743 A1 | 7/2010 | Gonzalez et al. | |
| 2010/0263714 A1 * | 10/2010 | Lauermann et al. | 136/251 |
| 2011/0275232 A1 * | 11/2011 | Duesterhoeft | 439/276 |
| 2011/0275244 A1 * | 11/2011 | Duesterhoeft et al. | 439/620.21 |
| 2011/0300741 A1 * | 12/2011 | Spicer et al. | 439/460 |

FOREIGN PATENT DOCUMENTS

WO   WO 2005/119769 A1   12/2005

OTHER PUBLICATIONS

Anixter, Wire and Cable Technical Information Handbook,Anixter Inc., Dec. 1996 [retrieved on Apr. 26, 2011], Retrieved from the Internet: <URL: http://www.galeon.com/lasinterredes/7.pdf>.

* cited by examiner

*Primary Examiner* — Gary F. Paumen
(74) *Attorney, Agent, or Firm* — Marshall & Melhorn, LLC

(57) ABSTRACT

A terminal assembly and a junction box for a photovoltaic module are provided. The terminal assembly includes a terminal connector, a power cable, and a gasket. The junction box is positioned over the terminal connector and attached to a first surface of the photovoltaic module. The terminal connector extends through the first surface of a photovoltaic module. The power cable is attached to the terminal connector and extends through the junction box. The gasket is housed between the first surface of the photovoltaic module and the junction box. The gasket comprises a first material and a second material and provides a seal about an end portion of the power cable. A method for forming the terminal assembly is also provided.

13 Claims, 4 Drawing Sheets

TERMINAL ASSEMBLY INCLUDING A JUNCTION BOX FOR A PHOTOVOLTAIC MODULE AND METHOD OF FORMING

RELATED APPLICATION

This application is claiming the benefit, under 35 U.S.C. 119(e), of the provisional application which was granted Ser. No. 61/311,097 filed on Mar. 5, 2010, the entire disclosure of which is hereby incorporated by reference.

BACKGROUND OF THE INVENTION

This invention relates generally to photovoltaic (PV) modules, and more specifically to an improved terminal assembly for use with a flexible PV module.

Flexible PV modules utilizing thin-film PV semiconductor materials, such as thin-film silicon based amorphous silicon (a-Si), can be formed to generate electricity. Thin-film PV semiconductor materials can be deposited from a variety of methods to form PV cells. Generally, a PV module has a plurality of PV cells electrically connected in series to form a string of cells. The PV module may include a plurality of PV cell strings. Typically, at the beginning of the first string of PV cells and at the end of the last string of PV cells is a terminal assembly. A terminal assembly allows the PV module to be electrically connected to a power grid or used as a local power source.

Each terminal assembly has at least one power cable attached to a terminal connector. To protect the connection point between the terminal cable and the terminal connector, a junction box is also typically provided. The junction box may be filled with a rigid potting material to provide support to the junction box. The potting material also may help to prevent moisture from entering the junction box by forming a seal around attachment point of the power cable and the terminal connector as well as the area between the power cable and the junction box.

However, since traditional potting materials are rigid, flexing of the PV module or power cable movement may separate the interfaces between the terminal assembly components, the junction box, and the potting material. Thus, leak points for moisture ingress may be created. Therefore, a need exists for a terminal assembly which prevents moisture from penetrating the junction box, is simple and robust in design, and inexpensive to manufacture.

BRIEF SUMMARY OF THE INVENTION

A terminal assembly including a junction box for a photovoltaic module is provided. A method of forming a terminal assembly for a photovoltaic module is also provided.

In an embodiment, the terminal assembly comprises a terminal connector, a power cable, and a gasket. The terminal connector extends through a first surface of the photovoltaic module. The junction box is positioned over the terminal connector and is attached to the first surface of the photovoltaic module. The power cable is attached to the terminal connector and extends through the junction box. The gasket comprises a first material and a second material. The gasket is housed between the first surface of the photovoltaic module and the junction box and provides a seal about an end portion of the power cable.

In another embodiment, the terminal assembly comprises a terminal connector, a power cable, and a gasket. The terminal connector extends through a first surface of a photovoltaic module. The junction box comprises a first portion and a second portion and is attached to the first surface of a photovoltaic module with an adhesive. The first portion of the junction box is positioned over the terminal connector and the second portion of the junction box has an aperture. The power cable is attached to the terminal connector and extends from the junction box first portion through the second portion aperture. Further, the power cable comprises an inner conductive core and an outer insulating sheath. The gasket is attached to the power cable outer sheath and is located between the first surface of the photovoltaic module and the junction box. The gasket comprises an epoxy and butyl rubber.

The method of forming the terminal assembly for a photovoltaic module comprises providing a terminal connector and attaching a power cable to the terminal connector. The method also comprises attaching a second gasket material to the terminal cable. A junction box is attached to the photovoltaic module and a portion of the terminal connector, a portion of the terminal cable and the second gasket material are housed within a cavity of the junction box. Further, the method comprises filling the junction box cavity with a first gasket material and curing the first gasket material to form a seal about an end portion of the power cable.

DETAILED DESCRIPTION OF THE INVENTION

It is to be understood that the invention may assume various alternative orientations and step sequences, except where expressly stated to the contrary. It should also be appreciated that the specific embodiments and methods illustrated in and described in the following specification are simply exemplary embodiments of the inventive concepts defined in the appended claims. For example, although the present invention will be described in connection with a-Si PV cells the present invention is not so limited. As such, the present invention may also be utilized with PV cells having at least one single junction (SJ) of cadmium telluride (CdTe), amorphous silicon germanium (a-SiGe), crystalline silicon (c-Si), microcrystalline silicon (mc-Si), nanocrystalline silicon (nc-Si), $CIS_2$, or CIGS.

Figure 1:
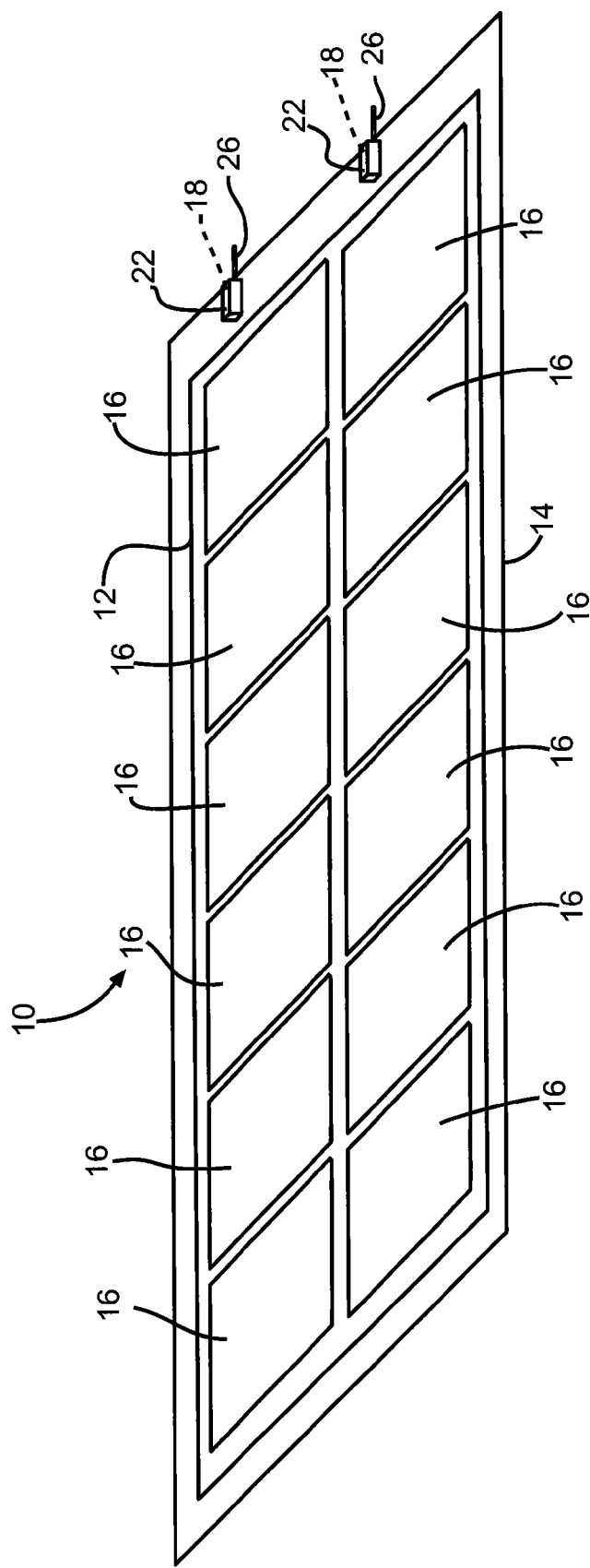
FIG. 1 is a perspective view of a photovoltaic module utilizing a terminal assembly and a junction box of the present invention.

A PV module 10 is provided in FIG. 1. In an embodiment, the PV module 10 is a flexible PV module. For example, the flexible PV module could be an XR-12 sold by the Xunlight Corporation. However, while the present invention will be described for use with a flexible PV module, the present invention is not so limited. Thus, it is within the scope of the present invention that rigid PV modules, i.e. PV modules utilizing glass substrates, may also be utilized to practice the present invention.

The PV module 10 has a first surface (facing the sun) protective layer 12 and a second surface protective layer 14. In an embodiment, the first surface protective layer 12 is composed of a fluoropolymer material. A preferred fluoropolymer is a fluorinated polyethylene such as ethylene tetrafluoroethylene. The PV module 10 also has at least one PV cell 16 encapsulated between the protective layers 12, 14. When a plurality of PV cells 16 are provided, the PV cells 16 are electrically connected in series to form at least one PV cell string. The PV module 10 may comprise a single PV cell string or multiple PV cell strings. The PV module 10 depicted in FIG. 1 has two PV cell strings.

To connect the PV module 10 to other PV modules (not depicted) or to use the PV module 10 as a single module power source, a pair of terminal assemblies 18 are provided. As would be appreciated by those skilled in the art, each terminal assembly 18 has either a positive or a negative electrical polarity. Additionally, at least one junction box 22 is provided to cover and protect the terminal assemblies 18. It is advantageous to separate the terminal assemblies 18. Thus, as shown in FIG. 1, two junction boxes 22 are provided. It should be appreciate that, although it is advantageous to provide a separate junction box 22 for each terminal assembly 18, the present invention is not so limited.

Figure 2:
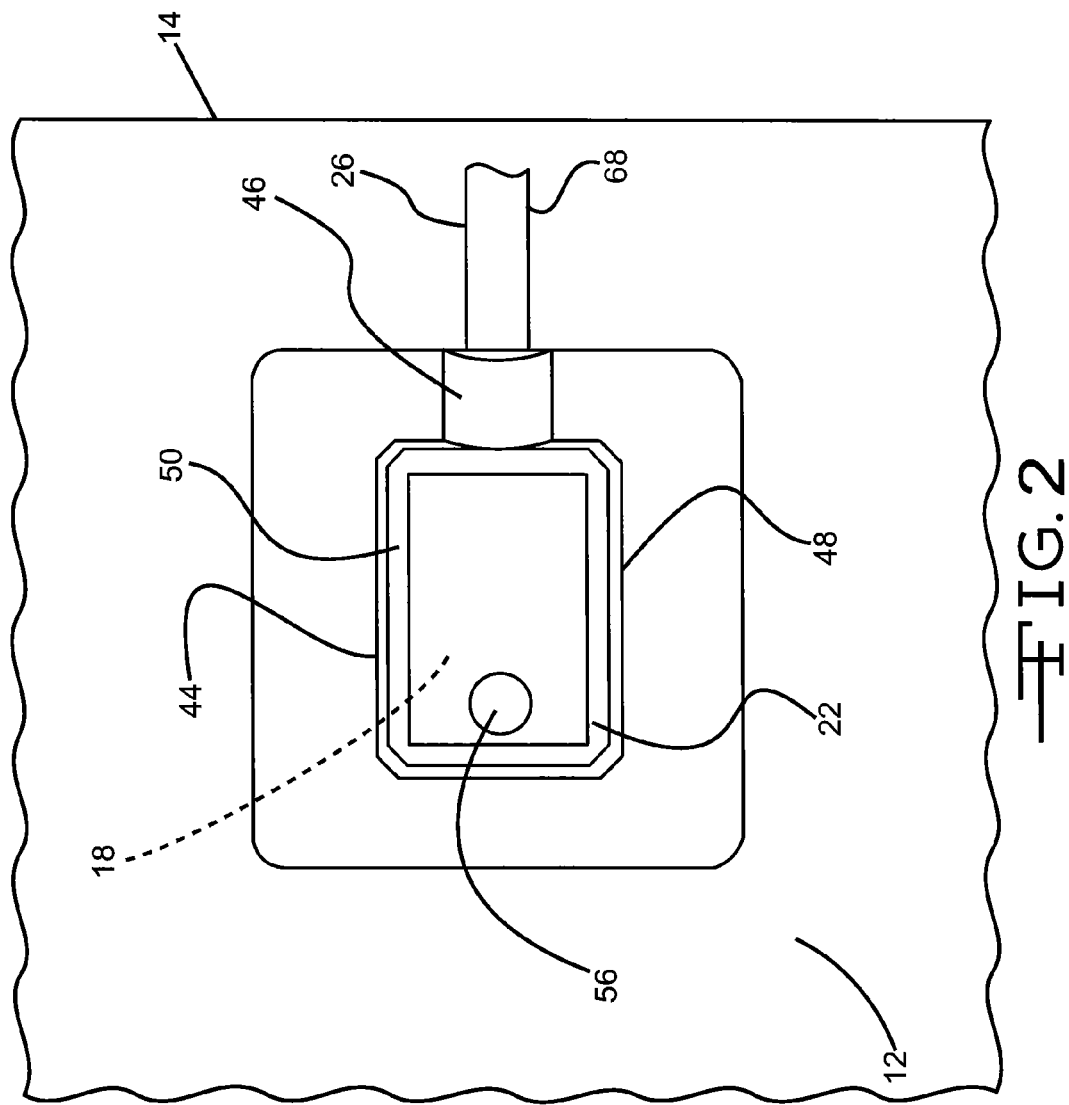
FIG. 2 is an enlarged top view of the junction box of FIG. 1.
Figure 3:
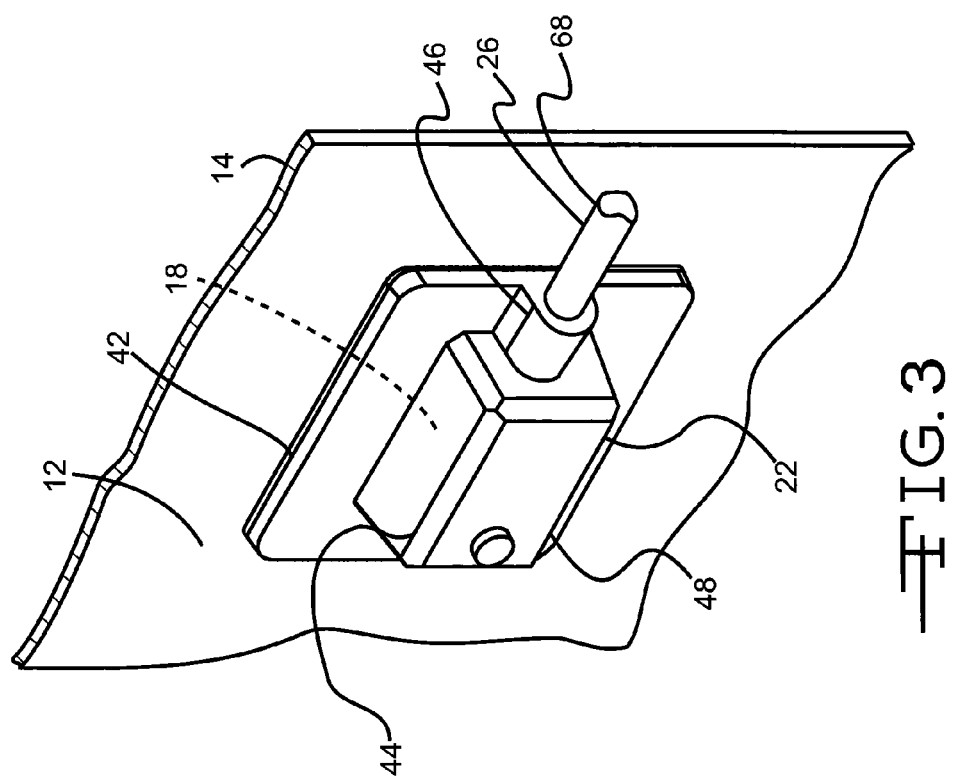
FIG. 3 is an enlarged perspective view of the junction box of FIG. 1.
Figure 4:
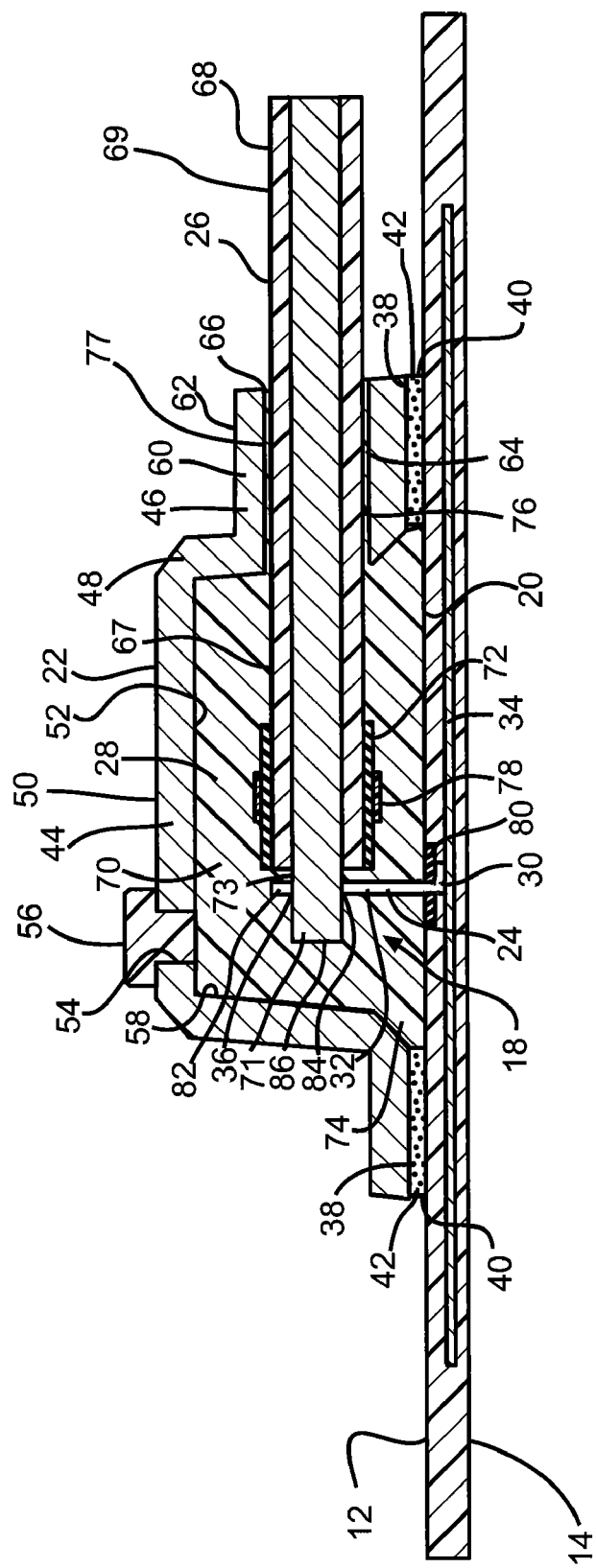
FIG. 4 is a cross-sectional view of FIG. 2.

Referring now to FIGS. 2-4, each terminal assembly 18 comprises a terminal connector 24, a power cable 26, and a gasket 28.

The terminal connector 24 is composed of a conductive material, preferably copper or an alloy thereof. The terminal connector 24 has a first end portion 30 and a second end portion 32. The first end portion 30 is attached to the second end portion 32. In an embodiment, the end portions 30, 32 may be configured such that the terminal connector 24 is L-shaped. The first end portion 30 extends through one of the protective layers 12, 14 and is attached to a header 34. As shown in FIG. 4, the first end portion 30 extends through the first surface protective layer 12. However, it should be appreciated that the present invention could be utilized on and over the second surface protective layer 14. The second end portion 32 is attached to the power cable 26. The second end portion 32 may have an aperture 36 to facilitate attaching the terminal connector 24 to the power cable 26.

Although a PV cell 16 is not depicted in FIGS. 2-4, the header 34 is in electrical communication with at least one PV cell 16 and the terminal connector 24. Thus, the terminal connector 24 is in electrical communication with at least one PV cell 16 and/or a PV cell string. The header 34 and the terminal connector 24 may be attached by soldering, welding, or a conductive adhesive. Additional methods for attaching the terminal connector 24 to the header 34 may also be utilized.

As stated, the power cable 26 is attached to the terminal connector 24. The power cable 26 is in electrical communication with the terminal connector 24. The power cable 26 may be attached to the terminal connector 24 mechanically, by welding, or by soldering at a connection point 84.

In an embodiment, the power cable 26 comprises a first end portion 67 and a second end portion 68. The power cable first end portion 67 is attached to the terminal connector 24 and is positioned within the junction box 22. The power cable first end portion 67 extends through a majority of the junction box 22. The power cable second end portion 68 may be attached to other PV modules or to a device (not depicted) if the PV module 10 is being used as a single module power source.

In an embodiment, the power cable 26 further comprises an outer sheath 69 and an inner core 71. The outer sheath 69 is composed of an insulating material and may comprise a polyolefin. The inner core 71 is composed of a conductive material. The inner core 71 may be a braided wire and composed of a metal or a metal alloy. The outer insulating sheath 69 covers and electrically insulates the inner conductive core 71. However, a portion 73 of the inner conductive core 71 adjacent the connection point 84 between the power cable 26 and the terminal connector 24 may not be covered by the outer insulating sheath 69. This embodiment allows the power cable 26 to be in electrical communication with the terminal connector 24 and allows it to be touch safe outside the junction box 22.

The gasket 28 is composed of electrically insulating materials. The gasket 28 contacts the first surface 12 of the PV module 10, the junction box 22, the terminal connector 24, and the power cable 26. In an embodiment, the gasket 28 is housed between the first surface 12 of the PV module 10 and the junction box 22. In this embodiment, the gasket 28 is located substantially within the junction box 22 and provides support for the junction box 22. The gasket 28 also provides a seal about the second end portion 32 of the terminal connector 24, the first end portion 67 of the power cable 26, and their connection point 84. Preferably, the seal is watertight.

The gasket 28 comprises a first material 70 and a second material 72. The first gasket material 70 is different than the second gasket material 72. As an example, the first gasket material 70 has a different composition than the second gasket material 72. Additionally, the first gasket material 70 may have different physical properties than the second gasket material 72. For example, the first gasket material 70 may be more rigid than the second gasket material 72. Also, in an embodiment, the first and second gasket materials 70, 72 have a different composition than the material of the outer sheath 69 of the power cable 26.

The first gasket material 70 may be an epoxy. In an embodiment, the first gasket material 70 may be a curable liquid epoxy. A suitable curable epoxy may be DP190 sold by 3M. Additionally, in certain embodiments, the first gasket material 70 may be a thermoset material. In these embodiments, the first gasket material 70 may be a thermoset resin epoxy.

In an embodiment, the second gasket material 72 is flexible. In another embodiment, the second gasket material 72 is elastomeric. In yet a further embodiment, the second gasket material 72 is heat treatable so that after being attached to the power cable 26 it can be formed into a desired shape or thickness. For example, the second gasket material 72 may be heated to a temperature equal to or above 100° F. and formed to have a substantially uniform diameter.

The second gasket material 72 may be an adhesive. In an embodiment, the second gasket material 72 is butyl rubber adhesive. In another embodiment, the second gasket material 72 is an adhesive selected from the group consisting of polyolefin, ethyl vinyl acetate, VHB™, acrylic, styrene-butadiene-styrene, styrene-isoprene-styrene, styrene-ethylene/butylene-styrene, and ethylene propylene diene monomer (EPDM). In these embodiments, the second gasket material 72 may be in the form of an adhesive tape. For example, a butyl rubber tape having adhesive on both sides of the tape or an EPDM seam tape could be utilized. A VHB™ foam tape sold by 3M could also be utilized. When the second gasket material 72 is a tape, the second gasket material 72 may be cut to a specific length and width so that when it is attached to the power cable 26 the second gasket material 72 can be formed to have a substantially uniform diameter.

The second gasket material 72 is sealingly attached to the power cable 26 and the first gasket material 70 to provide a watertight seal. More specifically, the second gasket material 72 is sealingly attached to the power cable first end portion 67 and aids in providing a watertight seal about the first end portion 67. Additionally, the second gasket material 72 may be formed so that it does not contact the PV module first surface 12 or the junction box 22, i.e. the first gasket material 70 is disposed between the PV module 10, the junction box 22, and the second gasket material 72. In these embodiments, the first gasket material 70 surrounds the second gasket material 72 and the first end portion 67 of the power cable 26.

In an embodiment, the gasket 28 further comprises a third gasket material 78. The third gasket material 78 is positioned between the first gasket material 70 and the second gasket material 72. In an embodiment, the third gasket material 78 is attached to the second gasket material 72 such that the second gasket material 72 remains sealingly attached with the power cable 26 and the first gasket material 70. Further, in this embodiment, the third gasket material 78 may be a heat shrink material which compresses a portion of the second gasket material 72. For example, the third gasket material 78 may be polyvinyl chloride.

In another embodiment, the gasket 28 further comprises a fourth gasket material 80 attached to the terminal connector 24 and the first surface protective layer 12 of the PV module 10. In this embodiment, the fourth gasket material 80 may be embedded in the first surface protective layer 12. The fourth gasket material 80 may be composed of the same material as the first gasket material 70, the second gasket 72, or the third gasket material 78. For example, the fourth gasket material 80 may be a strip of butyl rubber adhesive tape.

The junction box 22 is preferably composed of an electrically insulating material. In an embodiment, the junction box 22 may be composed of a polyester material. To provide additional strength the polyester material may be filled with fiberglass. The junction box 22 is attached to the PV module first surface protective layer 12 and is positioned over at least one terminal assembly 18. As such, the junction box 22 covers at least one terminal assembly 18 and a portion 20 of the first surface protective layer 12. Additionally, portions 38 of the junction box 22 are attached to the PV module 10 to form a substantially watertight seal 40 around each terminal assembly 18. The junction box 22 is preferably attached to the PV module first surface protective layer 12 with an adhesive layer 42. The adhesive layer 42 may be a pressure sensitive adhesive tape. A primer may be utilized to promote adhesion between the adhesive layer 42 and the first surface protective layer 12.

The junction box 22 comprises a first portion 44 and a second portion 46. The first portion 44 is attached to the second portion 46. Preferably, the first portion 44 and second portion 46 form a unitary body.

The junction box first portion 44 includes a wall 48. The first portion wall 48 has an outer surface 50 and an inner surface 52. An aperture 54 may be formed in the first portion wall 48. The aperture 54 extends from the outer surface 50 to the inner surface 52. A cap 56 may be disposed within the aperture 54 to maintain the integrity of the seal 40 around each terminal assembly 18.

The first portion wall inner surface 52 substantially defines a cavity 58 which is positioned over portions of the terminal assembly 18. In an embodiment, the terminal connector second end portion 32 is located within the cavity 58. Additionally, the power cable 26 is attached to the terminal connector 24 within the cavity 58. As depicted, the first portion wall 48 may be generally configured to have a partially rectangular shape. However, the shape of the first portion wall 48 is not limited to being a partial rectangle. In practice, the first portion wall 48 may be of any shape or configuration including a partial ellipse, square, or circle. As such, the cavity 58 may have a partial rectangle shape or may be configured to include another shape.

In an embodiment, the junction box second portion 46 includes a wall 60. The second portion wall 60 has an outer surface 62 and an inner surface 64. The second portion wall inner surface 64 defines an aperture 66. In an embodiment, the aperture 66 has a uniform diameter. The power cable 26 extends from the junction box first portion 44, where it is attached to the terminal connector 24, and through the second portion aperture 66.

The gasket 28 is housed between the first surface protective layer 12 of the photovoltaic module 10 and the junction box 22. In an embodiment, the gasket 28 is housed substantially within the junction box cavity 58 and second portion aperture 66. In this embodiment, a first portion 74 of the first gasket material 70 is located within the cavity 58 and a second portion 76 of the first gasket material 70 is located in a space 77 between the power cable 26 and the second portion wall inner surface 64. The first portion 74 of the first gasket material 70 is sealingly attached to the first surface protective layer 12 of the photovoltaic module 10, the junction box 22, the terminal connector 24, and the first end portion 67 of the power cable 26 to provide a watertight seal. The second portion 76 of the first gasket material 70 is also sealingly attached to the power cable 26 and the inner surface 64 of the junction box second portion 46 to provide a watertight seal.

The terminal assembly 18 allows power to be transferred from the PV module 10. Flexible PV modules are susceptible to damage adjacent the terminal assembly 18 and junction box 22 from moisture ingress. Specifically, moisture adjacent the connection point 84 of the terminal connector 24 and the power cable 26 can reduce the amount of power transferred from the PV module 10 and prevent the PV module 10 from being touch safe.

Moisture ingress into the junction box 22 is difficult to prevent for several reasons. First, flexing of the PV module 10 may occur during the manufacturing, shipping, or installation of the PV module 10. Flexing may create separation between the components of the terminal assembly 18 or between the components of the terminal assembly 18 and the junction box 22. Additionally, the terminal assembly 18 and the junction box 22 may be composed of materials which are not compatible to form a watertight seal. Thus, paths for moisture ingress may develop at the interfaces of the PV module first surface protective layer 12, the terminal assembly 18, and/or the junction box 22.

However, the present invention provides for the safe and repeatable transfer of power from the PV module 10 by forming a watertight seal about the first end portion 67 of the power cable 26. The present invention also provides that the connection point 84 between the terminal connector 24 and the power cable 26 is electrically insulated and isolated. Further, the present invention is mechanically strong and protects the terminal connector 24 and the power cable 26 from damage and is weatherable such that it will maintain performance for the functional life of the PV module 10.

The present invention also provides a method of forming the terminal assembly 18 for the PV module 10.

In an embodiment, the method comprises providing the terminal connector 24, attaching the power cable 26 to the terminal connector 24, attaching the second gasket material 72 to the power cable 26, and attaching the junction box 22 to the PV module 10. In this embodiment a portion 82 of the terminal connector 24, a portion 86 of the power cable 26, and the second gasket material 72 are housed within the junction box cavity 58.

In an embodiment, the second gasket material 72 may be formed into a seamless body. Preferably, the second gasket material 72 is formed so that the second gasket material 72 and the power cable 26 are in a concentric relationship. As noted above, in an embodiment the second gasket material 72 is heat treatable. Thus, in these embodiments, the method may further comprise forming the second gasket material 72 by applying heat to the second gasket material 72. Additionally, while the second gasket material 72 may be formed using heat, it may also be formed in combination with other forming methods, i.e. mechanical or roll forming.

In certain embodiments the first gasket material 70 may at a certain time be a liquid. Therefore, the method of the present invention may further comprise filling the junction box cavity 58 with the first gasket material 70 and curing the first gasket material 70. Thus, after a pre-determined cure time, the PV module 10 will be ready for use. Since, in certain embodiments the gasket materials 70, 72 are insulating, electrical isolation and insulation around the connection point 84 between the terminal connector 22 and the power cable 26 is provided.

The method may further comprise filling the junction box second portion aperture 66 with the first gasket material 70. In this embodiment, a ring gasket (not depicted) may be selectively positioned adjacent the power cable 26 and the aperture 66. After the aperture 66 is filled with the first gasket material 70 and the first gasket material 70 is cured, the ring gasket may be removed. Utilizing a ring gasket in this manner helps to prevent the first gasket material 70 from escaping out the aperture 66 before it is cured.

EXAMPLE

The following example and comparative example is for illustrative purposes only and is not to be construed as a limitation on the invention.

A pair of XR-12 PV modules made by the Xunlight Corporation were separately tested for insulation resistance. Each PV module had substantially the same construction. For instance, each PV module had 12 PV cells arranged into two PV cell strings and electrically connected in series. Each PV module had a pair of terminal assemblies. Each terminal assembly had either a positive or a negative electrical polarity and was in electrical communication with the PV cells via a header. A junction box was provided for each terminal assembly. Also, each PV module had the same protective layer composition. However, the first PV module utilized terminal assemblies and junction boxes formed as described for the present invention and the second PV module, the comparative example, utilized terminal assemblies and junction boxes known in the art.

The insulation resistance of each PV module was recorded during a wet insulation resistance test. The wet insulation test was conducted by submerging the PV modules in water and applying a voltage of 500 volts to the modules. Insulation resistance was measured using a dielectric analyzer made by Associated Research, Inc. and was measured in millions of ohms (M ohms). The insulation resistance was calculated based in part on the area of PV module being tested. The area of each PV module was 1.6 m$^2$.

The degree of wet insulation resistance for the first PV module was $\geq$21,416 M ohms and was $\leq$2.34 M ohms for the second PV module. Thus, the present invention increased the wet insulation resistance of the first PV module by almost a factor of 10,000. Therefore, it should be appreciated that the terminal assembly including the junction box and method of forming the terminal assembly as described, above, is an improvement over those known in the art. Additionally, it should be appreciated that utilizing and forming the terminal assembly 18 as described, above, allows a seal to be formed about the first end portion 67 of the power cable 26 and, specifically, around the connection point 84 between the terminal connector 24 and the power cable 26.

The above detailed description of the present invention is given for explanatory purposes. Thus, it will be apparent to those skilled in the art that numerous changes and modifications can be made without departing from the scope of the invention. Accordingly, the whole of the foregoing description is to be construed in an illustrative and not in a limitative sense.

The invention claimed is:

1. A terminal assembly including a junction box for a photovoltaic module, comprising:
   a terminal connector which extends through a first surface of a photovoltaic module;
   a junction box positioned over the terminal connector and attached to the first surface of the photovoltaic module;
   a power cable attached to the terminal connector and extending through the junction box; and
   a gasket comprising a first material and a second material housed between the first surface of the photovoltaic module and the junction box, wherein the gasket provides a seal about an end portion of the power cable.

2. The terminal assembly of claim 1, wherein the first gasket material is more rigid than the second gasket material.

3. The terminal assembly of claim 1, wherein the gasket further comprises a third material attached to the second gasket material, wherein the third material is a heat shrink material and is attached to the second gasket material such that the second material is sealingly attached with the first gasket material.

4. The terminal assembly of claim 1, wherein the second gasket material is elastomeric.

5. The terminal assembly of claim 1, wherein the power cable comprises an outer insulating sheath and an inner metallic core and wherein the second gasket material is attached to the outer sheath and the first gasket material to provide a watertight seal.

6. The terminal assembly of claim 1, wherein the second gasket material is heat treatable.

7. The terminal assembly of claim 1, wherein the second gasket material has a substantially uniform diameter.

8. The terminal assembly of claim 1, wherein the gasket provides support for the junction box.

9. A terminal assembly including a junction box for a photovoltaic module, comprising:
   a terminal connector which extends through a first surface of a photovoltaic module;
   a junction box attached to the first surface of the photovoltaic module with an adhesive, wherein the junction box comprises a first portion and a second portion, and wherein the first portion is positioned over the terminal connector and the second portion has an aperture;
   a power cable attached to the terminal connector and extending from the junction box first portion and through the second portion aperture, wherein the power cable comprises an inner conductive core and an outer insulating sheath; and
   a gasket composed of insulating materials which is attached to the power cable outer sheath and housed between the first surface of the photovoltaic module and the junction box, wherein the gasket comprises an epoxy and butyl rubber.

10. The terminal assembly of claim 9, wherein the power cable has a first end portion and a second end portion and wherein the gasket provides a watertight seal about the first end portion.

11. The terminal assembly of claim 9, wherein the butyl rubber does not contact the first surface of the photovoltaic module or the junction box.

12. The terminal assembly of claim 9, wherein the junction box first portion comprises an aperture and a cap is disposed within the aperture.

13. The terminal assembly of claim 9, wherein the epoxy surrounds the butyl rubber and an end portion of the power cable.

* * * * *